Figure 1:
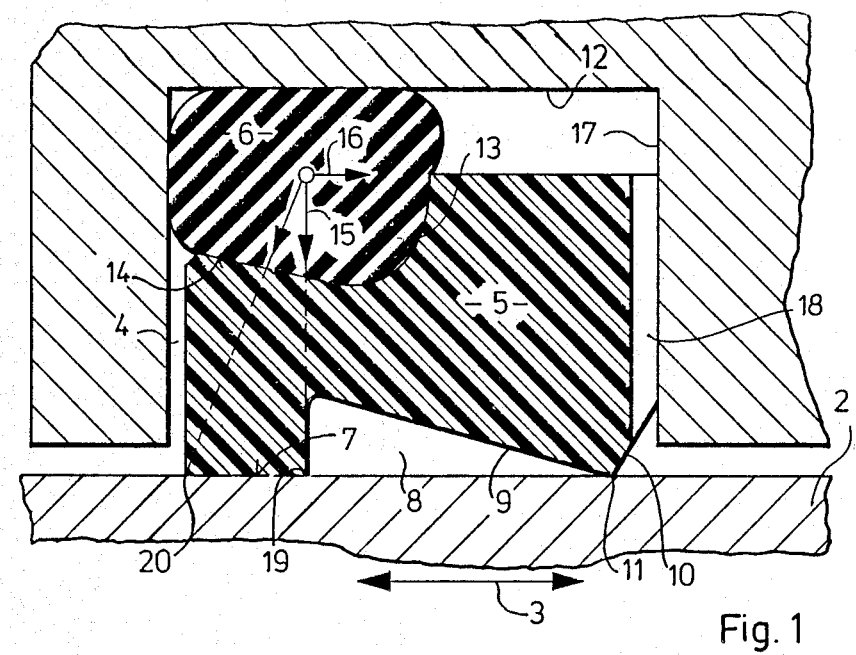

United States Patent [19]

Edlund et al.

[11] Patent Number: 4,709,932
[45] Date of Patent: Dec. 1, 1987

[54] DOUBLE WIPER SEAL ARRANGEMENT

[75] Inventors: Roy Edlund, Stuttgart, Fed. Rep. of Germany; Jørgen Høm, Holte, Denmark

[73] Assignee: Busak & Luyken GmbH and Co., Stuggart, Fed. Rep. of Germany

[21] Appl. No.: 9,298

[22] Filed: Jan. 30, 1987

[30] Foreign Application Priority Data

Feb. 6, 1986 [DE] Fed. Rep. of Germany ........ 3603669

[51] Int. Cl.$^4$ ............................................. F16J 15/32
[52] U.S. Cl. .................................... 277/165; 277/142; 277/152
[58] Field of Search ................................ 277/142–145, 277/152, 153, 165

[56] References Cited

U.S. PATENT DOCUMENTS

| | | | |
|---|---|---|---|
| 3,057,630 | 10/1962 | Sneed | 277/165 |
| 3,549,154 | 12/1970 | Jones | 277/165 X |
| 4,141,562 | 2/1979 | Wu | 277/165 X |
| 4,155,557 | 5/1979 | Grebert | 277/152 X |
| 4,449,718 | 5/1984 | Muller | 277/142 X |

FOREIGN PATENT DOCUMENTS

| | | |
|---|---|---|
| 3125688 | 6/1981 | Fed. Rep. of Germany . |
| 2256353 | 12/1974 | France . |
| 336705 | 4/1959 | Switzerland ........................ 277/152 |

OTHER PUBLICATIONS

"Technica", No. 11, 1964, pp. 848 to 852, and 912 to 916, German Periodical.

*Primary Examiner*—Robert S. Ward
*Attorney, Agent, or Firm*—Fields, Lewis, Pittenger & Rost

[57] ABSTRACT

In a double wiper arrangement, a wiper ring (5) and a stressing ring (6) are arranged in a groove (4) of a width which is only little larger than the width of the wiper ring (5). The stressing ring (6) loads the wiper ring (5) through a shoulder and an inclined circumferential surface (14) in such a manner that the wiper ring (5) is retained in contact with the flank (17) of the groove (4) on the high-pressure end and that a contact pressure is produced along a flat surface portion (7) which pressure diminishes at least nearly linearly along the said flat surface portion, starting from its inner end, but which is still defined at the outer end thereof.

5 Claims, 3 Drawing Figures

DOUBLE WIPER SEAL ARRANGEMENT

The present invention relates to a double wiper arrangement comprising a wiper ring made from a tough elastic material and fitted in the groove of one of two machine parts which are movable in a direction perpendicular to the said groove, and a stressing ring made from a rubber-elastic material, arranged between the wiper ring and the base of the groove and loading the wiper ring in the radial direction, the wiper ring being provided on its one end with a surface portion which rests flat against the other machine part, with an edge near its other end which rests against the other machine part and which is formed by the line of intersection of two conical surfaces rising outwardly and towards the flat surface portion, respectively, and with a recess arranged on its side facing the base of the groove, opposite the flat surface portion, for receiving the stressing ring.

Double wiper arrangements of this type are in use in many different designs, in particular in hydraulic piston and cylinder units where the wiper ring and the stressing ring are incorporated in the rod guide. In this case, the double wiper arrangement is preceded on the high-pressure end by one or more sealing rings so that the function of the wiper ring is substantially reduced to wiping off any contaminations sticking to the outer portion of the rod so as to prevent them from penetrating into the real sealing area. The outer wiper lip, which in the case of the double wiper arrangement of the type described above is formed by the surface portion of the wiper ring resting flat against the other machine part, must be sufficiently strong to remove even larger dirt particles safely from the rod surface, but must at the same time be sufficiently tight to wipe off all oil and grease with sufficient safety. At the same time, a wiper ring of this type has to prevent any fluid leaking through the preceding sealing arrangement from penetrating to the outside.

The double wiper arrangements known heretofore do not come up to all these requirements in the desired manner. The invention, therefore, has for its object to improve a double wiper arrangement of the type described above in such a manner that it provides a perfect barrier against both, leaking liquid and penetrating foreign bodies of all types.

According to the invention, this object is achieved by the combination of the following features:

(1) The groove is only little larger than the width of the wiper ring, and the depth and width of the recess as well as the dimensions of the stressing ring are adapted to each other in such a manner that
  (a) the wiper ring is retained in the groove in contact with the flank of the groove which is opposite to the said stressing ring, at least under normal operating conditions, and
  (b) the maximum of pressure exerted by said stressing ring is situated above the inner edge of the flat surface portion.
(2) The recess surface extending concentrically to the base of the groove rises towards the end of the wiper ring so that the space accommodating the stressing ring gets narrower towards the end of the wiper ring and the force exerted by the stressing ring produces a contact pressure which diminishes at least nearly linearly along the flat surface portion, starting from its inner end, but is still defined at the outer end thereof.
(3) The end face adjacent the outer conical surface is provided with radial relief grooves.

The double wiper arrangements known heretofore have the wiper ring mounted in the groove with axial play, and the sizing of the stressing ring is such that a tension force is exerted only in the radial direction. Consequently, the wiper ring and the stressing ring are entrained by the axial relative movements between the machine parts so that the wiper ring is displaced axially in the groove and the stressing ring, normally an O ring, performs a rolling movement between the wiper ring and the base of the groove. These movements result in a pumping effect which is amplified in particular by leakage fluid being rolled over by the stressing ring. This pumping effect is prevented by the design of the double wiper arrangement proposed by the invention. The flat contact between the wiper ring and the flank of the groove on the high-pressure side would, however, seal the space between the wiper ring and the base of the groove, and there would be a risk of the sealing edge of the wiper ring on the high-pressure end being lifted off the other machine part. This risk is prevented by the radial relief grooves provided on the high-pressure end which ensure pressure-equalizing between the forward and rear sides of the wiper ring.

The sealing area formed by the flat surface portion serves the dual purpose to provide a fluid seal towards the high-pressure end and a seal against dirt penetrating from the outside. For ensuring the wiping effect, a high surface pressure is required at the outer edge of the wiper ring. At the same time, however, a high surface pressure must be maintained at the inner edge of the flat surface portion if the desired sealing effect against penetrating fluid is to be ensured. These two requirements, which apparently cannot be met easily at the same time, are also fulfilled by the design of the double wiper arrangement proposed by the invention, due to the particular sizing of the wiper ring, the stressing ring and the groove as specified herein. A point of particular importance in this connection is seen in the fact that the surface of the recess, which extends concentrically to the base of the groove, is designed as conical surface because this ensures that the surface pressure in the area of the flat surface portion, which reaches its maximum at the inner edge of the said surface portion, does not drop towards the outer edge in an undefined manner, but is still defined at the outer edge and sufficiently high to provide a perfect wiping effect. The combination of the features of the double wiper arrangement according to the invention therefore provides a considerable improvement as regards the wiping and sealing effect, compared with conventional double wiper arrangements of the type described above.

The sealing ring or, as it is sometimes also called, the retainer ring, and the wiper ring of the double wiper arrangement according to the invention may consist of the same materials as used heretofore for arrangements of this type. The retainer ring may be a conventional O ring made from elastomer materials, while the wiper ring may consist, in particular, of modified or filled PTFE materials. In a particularly preferred embodiment of the invention, however, the wiper ring is made from polyurethane. Polyurethane materials combine in themselves sufficient hardness and toughness with a high degree of elasticity which ensures that the wiper ring adapts itself optimally to any irregularities existing in the surface of the other machine part. For the same purpose it is also advantageous if the diameter of the wiper ring, in the unloaded condition, differs from the diameter of the other machine part by approximately 1% so that the two machine parts would overlap by this amount.

In order to achieve the before-mentioned sufficient, though not excessive contact pressure at the outer edge of the flat surface portion, it may further be appropriate to provide that in the unloaded condition of the wiper ring the flat surface portion is inclined relative to the axis of the ring by an angle of up to ±15°.

Figure 2:
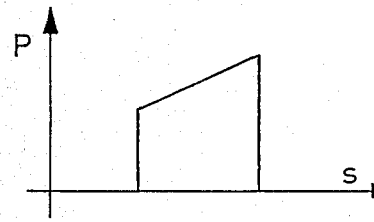
Figure 3:
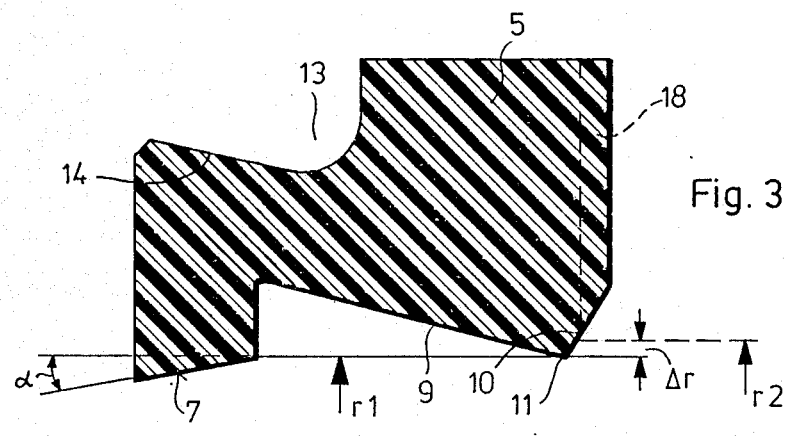

The invention will be described and explained hereafter in greater detail with reference to the embodiment shown in the drawing. The features shown and described in the specification and the drawing may be used in other embodiments of the invention either individually or in any desired combination thereof. In the drawing FIG. 1 shows a cross-section through a double wiper arrangement according to the invention, in greatly enlarged scale;

FIG. 2 shows a diagram representing the change of the surface pressure over the flat surface portion of the wiper ring of the double wiper arrangement shown in FIG. 1; and FIG. 3 shows a cross-section through the wiper ring of the double wiper arrangement shown in FIG. 1, in slack condition.

The double wiper arrangement shown in FIG. 1 serves for wiping off leakage fluid in the gap between two machine parts 1 and 2 which, in operation, move axially relative to each other in the direction indicated by arrow 3. Typically, the machine part 2 is the rod, and the machine part 1 the cylinder of a hydraulic piston-and-cylinder unit.

An annular groove 4 recessed into the machine part 1 perpendicularly to the sense of movement 3 accommodates a wiper ring 5 and a sealing or retainer ring 6. The wiper ring 5 consists of a tough elastic polyurethane. It exhibits a substantially Z-shaped cross-section whose cross members extend parallel to the flanks of the groove 4. The outer end, relative to the groove 4, of the one cross member of the Z forms a surface portion 7 which rests flat against the other machine part 2 and which is followed by a recess 8 defining the middle member of the Z shape and exhibiting a rectangular cross-section. The other end of the wiper ring 5 is provided with a chamfer on the side facing the other machine part 2 so that two conical surfaces 9, 10 are created which intersect each other in an edge 11 by which the wiper ring 5 rests against the machine part 2 near its other end. The end of the other cross member of the Z shape is disposed at a certain distance to, and opposite the base of the groove 12. Due to the Z shape of the wiper ring 5, a recess 13 is formed opposite the cross member provided with the flat surface portion 7. The recess 13 is taken up by the O ring 6. The surface 14 of the recess, which extends concentrically to the base of the groove 12, rises towards the end of the wiper ring 5 so that the recess 13 gets narrower towards the end of the wiper ring 5.

As can be seen in FIG. 1, the dimensions of the groove 4, of the wiper ring 5 with the recess 13, and the O ring 6 are selected in such a manner that the cross-section of the O ring is subjected to considerable deformation so that it exerts upon the wiper ring 5 not only a radial tension force 15, but also an axial tension force 16 due to which the wiper ring 5 is pressed firmly against the flank 17 of the groove 4 on the high-pressure side. The wiper ring 5 is provided on this face on the high-pressure side with radial relief grooves 18 which are, however, not deep enough to extend down to the edge 11.

Further, it is ensured by the particular sizing of the arrangement that the maximum contact pressure produced by the radially acting tension force 15 is encountered at the inner edge 19, i.e. the edge on the high-pressure side, of the flat surface portion 7. This is illustrated also by the diagram of FIG. 2 where the axial expansion s of the wiper ring 5 has been plotted against the abscissa while the surface pressure p by which the wiper ring 5 is pressed against the machine part 2, has been plotted against the ordinate. The diagram shows only the quantitative development of the surface pressure, not its absolute value because the latter depends on the dimensions of the double wiper arrangement and the operating conditions under which such a double wiper arrangement is to be used.

The axial retention of the wiper ring 5 in the groove 4 is strong enough to ensure that the wiper ring 5 cannot perform any axial movements in the groove 4 under the effect of the entraining forces exerted by the machine part 2. Consequently, the retaining ring 6 on its part is also not subjected under operating conditions to any periodically varying deformations and does not, in particular, perform any rolling movements in response to movements performed by the wiper ring 5. Consequently, any leakage resulting from "pumping movements" of the double wiper arrangement is safely excluded.

The edge 11 formed by the conical surfaces 9, 10 serves for wiping off any oil that may leak through other sealing arrangements provided at the high-pressure end of the double wiper arrangement. The relief grooves 18 provide a pressurebalancing effect to the rear of the wiper ring 5, inspite of the firm contact between the wiper ring 5 and the flank 17 of the groove on the high-pressure side, so that no pressure can build up on the side of the wiper ring 5 facing the machine part 2 that could lift the edge 11 off the machine part 2. Consequently, the edge 11 provides already an efficient seal which is even improved by a certain returning effect resulting from the flat pitch of the conical face 9 following the edge 11 at the low-pressure side. Any leakage oil that may still penetrate into the triangular space 8 is definitely blocked by the high surface pressure prevailing at the edge 19 of the surface portion 7. The fact that the maximum surface pressure is encountered at the edge 19 ensures that no leakage oil can enter the area below the surface portion 7. At the same time, the high surface pressure maintained at the outer edge 20 of the surface portion 7 ensures that contaminations of any type, including lubricants and greases, that may stick to the machine part 2 are safely removed, such contaminations being not subjected to any pressure.

It is of advantage for the function of the double wiper arrangement according to the invention if the wiper ring 5 rests against the machine part 2 under a certain initial tension. To this end, the wiper ring 5 is, conveniently, sized in the manner illustrated in FIG. 3. Assuming that the machine part 2 is a rod, the diameter r1 of the contact surface of the wiper ring 5 is smaller by an amount r than the diameter r2 of the rod, r being approximately 1% of the nominal diameter, i.e. normally of the rod diameter r2. It may also be of advantage for achieving the surface pressure illustrated in FIG. 2 if in the slack condition of the wiper ring 5 the surface portion 7 is inclined by an angle relative to the cylinder surface so that the contact surface 7 forms a conical surface whose diameter increases or diminishes in outward direction. Depending on the selected materials, dimensions and operating conditions, the angle may have a value of up to ±15°.

It is understood that the invention is not restricted to the embodiment shown, but that deviations are possible without leaving the scope of the invention. In particular, the invention has been described before with reference to an embodiment where the groove is arranged in a machine part surrounding a rod. Instead, a double wiper arrangement of correspondingly reversed design could of course also be arranged at the periphery of an inner machine part. In addition, the relations between the individual components of the double wiper arrangements may be varied in many different ways, in particular as regards the depth and width of the groove and, consequently, as regards the relative diameters of the wiper ring and the retainer ring.

We claim:

1. Double wiper arrangement comprising a wiper ring made from a tough elastic material and fitted in the groove of one of two machine parts which are movable in a direction perpendicular to the said groove, and a stressing ring made from a rubber-elastic material, arranged between the wiper ring and the base of the groove and loading the wiper ring in the radial direction, the wiper ring being provided on its one end with a surface portion which rests flat against the other machine part, with an edge near its other end which rests against the other machine part and which is formed by the line of intersection of two conical surfaces rising outwardly and towards the flat surface portion, respectively, and with a recess arranged on its side facing the base of the groove, opposite the flat surface portion, for receiving the stressing ring, characterized by the combination of the following features:

(1) the said groove is only little larger than the width of the said wiper ring, and the depth and width of the said recess as well as the dimensions of the said stressing ring are adapted to each other in such a manner that
  (a) the said wiper ring is retained in the groove in contact with the flank of the groove which is opposite to the said stressing ring, at least under normal operating conditions, and
  (b) the maximum of pressure exerted by the said stressing ring is situated above the inner edge of the said flat surface portion,
(2) the recess extending concentrically to the base of the said groove rises towards the end of the said wiper ring so that the space accommodating the said stressing ring gets narrower towards the end of the said wiper ring and the force exerted by the said stressing ring produces a contact pressure which declines at least nearly linearly along the said flat surface portion, starting from its inner end, but is still defined at the outer end thereof, and
(3) the end face adjacent the outer conical surface is provided with radial relief grooves.

2. Double wiper arrangement according to claim 1, wherein the said wiper ring is made from polyurethane.

3. Double wiper arrangement according to claim 1, wherein the diameter ($r_1$) of the said wiper ring, in the unloaded condition, differs from the diameter ($r_2$) of the said other machine part by approximately 1% so that the said two machine parts would overlap by this amount.

4. Double wiper arrangement according to claim 1, wherein in the unloaded condition of the said wiper ring the said flat surface portion is inclined relative to the axis of the ring by an angle of between −15° and +15°.

5. Double wiper arrangement according to claim 3, wherein in the unloaded condition of the said wiper ring the said flat surface portion is inclined relative to the axis of the ring by an angle of between −15° and +15°.

* * * * *